F. G. McCLELLAN.
BOLT.
No. 109,640. Patented Nov. 29, 1870.
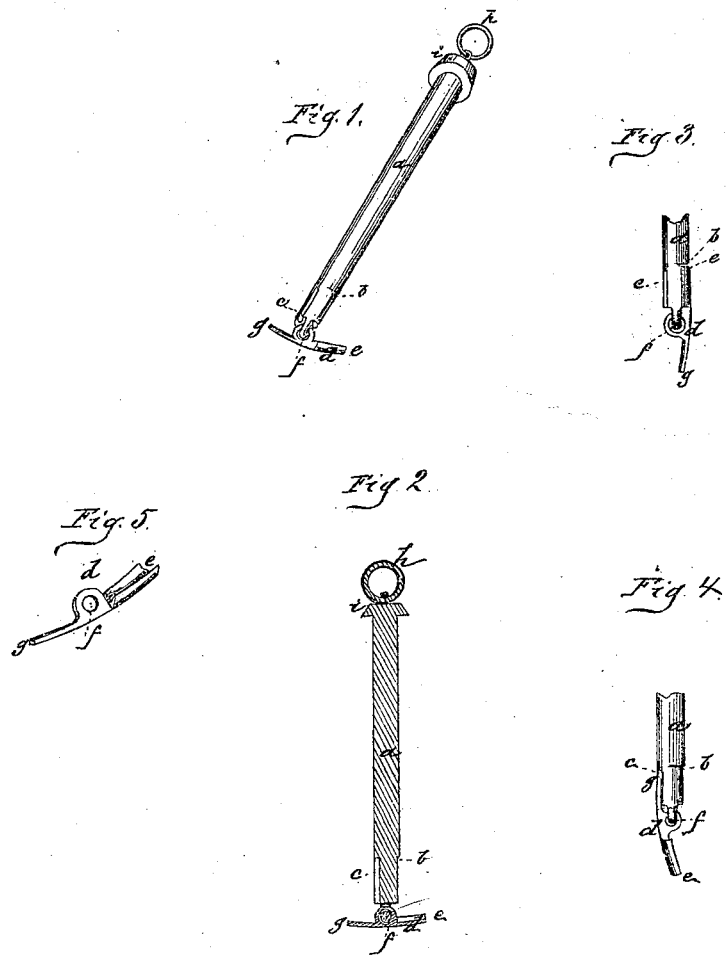
Witnesses
J. T. Allen
M. N. Bates
Felix G. McClellan, Inventor:
by Theodore Munger,
his Attorney

United States Patent Office.

FELIX G. McCLELLAND, OF ATTICA, OHIO.

Letters Patent No. 109,640, dated November 29, 1870; antedated November 19, 1870.

IMPROVEMENT IN BOLTS.

The Schedule referred to in these Letters Patent and making part of the same.

Be it known that I, FELIX G. McCLELLAND, of Attica, in the county of Seneca and State of Ohio, have invented a new and useful Improvement in Bolts, of which the following is a specification.

Nature of the Invention

My invention relates to an improvement in bolts for securing the tail-board of a wagon, and consists in the construction of a guard or key having one of its ends convexo-convex and the other concavo-convex, and of about the same weight, said guard being linked through an eye in its longitudinal center to a shaft provided with a concave recess or groove to receive the convexo-convex end of the guard, and a convex recess, over which the concavo-convex end of the guard closes, to permit the bolt to be inserted into an eye or hole, as will hereinafter be more fully specified.

Description of the Drawing.

Figure 1 is a perspective view of the bolt.
Figure 2 is a vertical section of the same.
Figure 3 is a view of a section of the bolt showing the guard closed.
Figure 4 is a view of a section of the bolt showing the guard in a position the reverse of that shown in fig. 3.
Figure 5 is a perspective view of the guard.

General Description.

The shaft $a$ has the shouldered head $i$ provided with the ring $h$.

The shaft may be constructed without the ring $h$. When, however, the ring is used, a chain may be attached to it and to any convenient part of the machine or implement in which the bolt is used.

The shaft $a$ has the groove or concave recess $c$ and the convex recess $b$ on opposite sides, at its point, for receiving the ends of the guard $d$.

The end $g$ of the guard $d$ is made convexo-convex, and the end $e$ is made concavo-convex and of about the same weight.

The guard $d$ is attached to the shaft $a$ by a link which is forged on the end of the shaft, thrust through the eye $f$ of the guard $d$, and bent afterward.

The guard $d$ need be made only a very little longer than the diameter of the shaft $a$, in order to hold the bolt in the eye in which it may be inserted.

The groove $c$ and convex recess $b$ receiving the ends $g$ and $e$ of the guard $d$ permit the bolt to be inserted into an eye that is only large enough to admit the shaft $a$.

The shaft need only be as long from the shoulder of the head $i$ to the top of the recesses $b$ and $c$ as a line that measures the distance between the extremes of the eye or hole in which the bolt is to be used.

By placing either end of the guard $d$ in its corresponding recess the bolt can be inserted into its eye or hole.

As soon as the guard $d$ passes out on the opposite side of the eye it will fall into a position at such an angle to the shaft as to prevent the bolt from falling or being jarred from its place in the eye.

Claim.

I claim as my improvement—

The guard $d$, having the ends $g$ and $e$ constructed as described, when used in combination with the shaft $a$, provided with the groove $c$ and convex recess $b$, for receiving the corresponding ends of the guard $d$, and with the head $i$, with or without the ring $h$, when the whole is arranged and operated in the manner and for the purpose hereinbefore specified.

In testimony that I claim the foregoing improvement in bolts as above described, I have hereunto set my hand and seal this 4th day of February, 1870.

FELIX G. McCLELLAND. [L. S.]

Witnesses:
LESTER SUTTON,
JOHN McLAUGHLIN.